United States Patent
Buchen et al.

(10) Patent No.: US 9,444,799 B2
(45) Date of Patent: *Sep. 13, 2016

(54) SYSTEM AND METHOD FOR DYNAMICALLY ALLOCATING STREAM IDENTIFIERS IN A MULTI-ENCRYPTION TRANSPORT SYSTEM

(71) Applicant: Cisco Technology, Inc., San Jose, CA (US)

(72) Inventors: Neil B. Buchen, Sugar Hill, GA (US); Thomas C. Wilson, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,354

(22) Filed: Mar. 24, 2015

(65) Prior Publication Data

US 2015/0195260 A1 Jul. 9, 2015

Related U.S. Application Data

(62) Division of application No. 13/626,006, filed on Sep. 25, 2012, now Pat. No. 9,002,008, which is a division of application No. 11/383,373, filed on May 15, 2006, now Pat. No. 8,275,132.

(51) Int. Cl.
*H04L 29/06* (2006.01)
*H04N 7/167* (2011.01)
*H04N 21/234* (2011.01)
(Continued)

(52) U.S. Cl.
CPC ......... *H04L 63/0485* (2013.01); *H04L 65/607* (2013.01); *H04N 7/1675* (2013.01); *H04N 21/2347* (2013.01); *H04N 21/23412* (2013.01);
(Continued)

(58) Field of Classification Search
CPC ............ H04L 63/0485; H04L 65/607; H04N 21/835; H04N 21/26609; H04N 21/23412; H04N 21/26613; H04N 21/2347; H04N 7/1675
USPC ............... 713/160, 161, 166, 176, 189, 182; 380/239, 212, 210, 216, 277, 238, 240, 380/241
See application file for complete search history.

(56) References Cited

U.S. PATENT DOCUMENTS

| | | | |
|---|---|---|---|
| 5,864,358 | A | 1/1999 | Suzuki et al. |
| 6,223,285 | B1 | 4/2001 | Komuro et al. |

(Continued)

FOREIGN PATENT DOCUMENTS

| | | |
|---|---|---|
| WO | 03061288 A1 | 7/2003 |
| WO | 2005004457 A1 | 1/2005 |
| WO | 2005004458 A1 | 1/2005 |

OTHER PUBLICATIONS

International Search Report dated Nov. 12, 2007 cited in Application No. PCT/US2007/068532.

(Continued)

*Primary Examiner* — David García Cervetti
(74) *Attorney, Agent, or Firm* — Merchant & Gould P.C.

(57) ABSTRACT

The present invention is suitable for use in a multi-encrypted system that dynamically allocates stream identifiers in a second stream depending upon the identifiers in a first stream. The first stream is monitored and counters are incremented with the presence of an identifier. The count for each of the counters is then received. Using the count, a control processor then assigns or revises identifiers in the second stream.

8 Claims, 8 Drawing Sheets

(51) Int. Cl.
*H04N 21/2347* (2011.01)
*H04N 21/266* (2011.01)
*H04N 21/835* (2011.01)

(52) U.S. Cl.
CPC .. *H04N 21/26609* (2013.01); *H04N 21/26613* (2013.01); *H04N 21/835* (2013.01)

(56) References Cited

U.S. PATENT DOCUMENTS

| | | | |
|---|---|---|---|
| 7,113,523 B1 | 9/2006 | Kubota et al. | |
| RE39,319 E | 10/2006 | Park | |
| 7,124,303 B2* | 10/2006 | Candelore | H04N 7/162 348/E5.004 |
| 7,127,619 B2* | 10/2006 | Unger | H04N 7/162 713/189 |
| 7,139,398 B2* | 11/2006 | Candelore | H04N 7/162 348/E5.004 |
| 7,146,008 B1* | 12/2006 | Hannah | H04N 7/1675 280/208 |
| 7,151,831 B2* | 12/2006 | Candelore | H04N 7/162 348/E5.004 |
| 7,155,012 B2* | 12/2006 | Candelore | H04K 1/00 348/E5.004 |
| 7,218,738 B2* | 5/2007 | Pedlow, Jr. | H04N 7/162 380/218 |
| 7,224,798 B2* | 5/2007 | Pinder | H04N 21/63345 348/E5.004 |
| 7,243,202 B2 | 7/2007 | Thomas | |
| 7,287,168 B2* | 10/2007 | Candelore | H04N 7/162 348/E7.056 |
| 7,292,691 B2* | 11/2007 | Candelore | H04N 7/162 375/240.13 |
| 7,302,059 B2* | 11/2007 | Candelore | H04K 1/00 348/E7.056 |
| 7,310,422 B2* | 12/2007 | Candelore | H04N 7/162 348/E5.004 |
| 7,310,423 B2* | 12/2007 | Hobrock | H04L 63/0428 348/E7.056 |
| 7,319,753 B2* | 1/2008 | Candelore | H04N 7/162 348/E5.004 |
| 7,336,787 B2* | 2/2008 | Unger | H04N 7/162 348/E5.004 |
| 7,583,701 B2* | 9/2009 | Miyazaki | H04W 28/06 370/202 |
| 7,751,561 B2 | 7/2010 | Candelore et al. | |
| 7,917,557 B2* | 3/2011 | Shteyn | G11B 27/329 707/999.107 |
| 7,983,417 B2 | 7/2011 | Buchen et al. | |
| 8,275,132 B2 | 9/2012 | Buchen et al. | |
| 8,755,518 B2 | 6/2014 | Buchen et al. | |
| 9,002,008 B2 | 4/2015 | Buchen et al. | |
| 2002/0064189 A1* | 5/2002 | Coupe | H04N 21/434 370/537 |
| 2002/0083173 A1 | 6/2002 | Musoll et al. | |
| 2002/0087502 A1* | 7/2002 | Nagy | H04M 15/00 |
| 2002/0087999 A1* | 7/2002 | Kashima | H04N 5/4401 725/100 |
| 2002/0110134 A1* | 8/2002 | Gracon | H04L 47/10 370/412 |
| 2002/0154636 A1* | 10/2002 | Thomas | H04L 63/0428 370/392 |
| 2002/0194613 A1* | 12/2002 | Unger | H04N 7/162 725/118 |
| 2002/0196939 A1* | 12/2002 | Unger | H04N 7/162 380/216 |
| 2003/0002577 A1* | 1/2003 | Pinder | H04B 1/66 375/240.01 |
| 2003/0021412 A1* | 1/2003 | Candelore | H04N 7/162 380/217 |
| 2003/0026423 A1* | 2/2003 | Unger | H04N 7/162 380/217 |
| 2003/0037235 A1 | 2/2003 | Aziz et al. | |
| 2003/0046686 A1* | 3/2003 | Candelore | H04N 7/162 725/31 |
| 2003/0059047 A1* | 3/2003 | Iwamura | H04N 7/163 380/201 |
| 2003/0065917 A1 | 4/2003 | Medvinsky et al. | |
| 2003/0081776 A1* | 5/2003 | Candelore | H04N 7/162 380/200 |
| 2003/0123664 A1* | 7/2003 | Pedlow, Jr. | H04N 7/162 380/218 |
| 2003/0133570 A1 | 7/2003 | Candelore et al. | |
| 2003/0156718 A1* | 8/2003 | Candelore | H04N 7/162 380/211 |
| 2003/0159139 A1* | 8/2003 | Candelore | H04N 7/162 725/25 |
| 2003/0159140 A1 | 8/2003 | Candelore | |
| 2003/0206538 A1 | 11/2003 | Rezaiifar et al. | |
| 2003/0212886 A1* | 11/2003 | Sugiura | H04L 63/0457 713/150 |
| 2003/0226011 A1 | 12/2003 | Kuwano et al. | |
| 2004/0003008 A1 | 1/2004 | Wasilewski et al. | |
| 2004/0047470 A1 | 3/2004 | Candelore | |
| 2004/0062247 A1* | 4/2004 | Farla | H04J 3/062 370/394 |
| 2004/0068739 A1* | 4/2004 | Russ | H04N 5/44543 725/39 |
| 2004/0136532 A1* | 7/2004 | Pinder | H04N 21/63345 380/239 |
| 2004/0139337 A1* | 7/2004 | Pinder | H04N 21/63345 713/189 |
| 2004/0162855 A1* | 8/2004 | Nagy | H04M 15/00 |
| 2004/0181666 A1* | 9/2004 | Candelore | H04N 7/162 713/160 |
| 2004/0215691 A1* | 10/2004 | Maria Van De Ven | H04N 7/163 709/200 |
| 2004/0247122 A1* | 12/2004 | Hobrock | H04L 63/0428 380/241 |
| 2004/0260829 A1* | 12/2004 | Husak | H04L 47/15 709/232 |
| 2005/0086355 A1* | 4/2005 | Deshpande | H04L 29/06027 709/231 |
| 2005/0102702 A1* | 5/2005 | Candelore | H04N 7/163 725/100 |
| 2005/0108746 A1* | 5/2005 | Futagami | H04L 9/00 725/31 |
| 2005/0114890 A1* | 5/2005 | Mountain | H04N 21/23608 725/54 |
| 2005/0152548 A1* | 7/2005 | Wasilewski | H04N 7/1675 380/216 |
| 2005/0169468 A1* | 8/2005 | Fahrny | H04N 7/1675 380/210 |
| 2005/0180568 A1* | 8/2005 | Krause | H04N 21/23608 380/212 |
| 2005/0210523 A1 | 9/2005 | Parnell et al. | |
| 2006/0115083 A1* | 6/2006 | Candelore | H04N 7/162 380/216 |
| 2006/0153379 A1* | 7/2006 | Candelore | H04N 7/162 380/216 |
| 2006/0209906 A1* | 9/2006 | Dabrowa | H04N 21/4332 370/535 |
| 2006/0233369 A1* | 10/2006 | Pinder | H04N 21/63345 380/216 |
| 2006/0245589 A1* | 11/2006 | Pinder | H04N 21/43856 380/42 |
| 2006/0262926 A1* | 11/2006 | Candelore | H04N 7/162 380/200 |
| 2006/0269060 A1* | 11/2006 | Candelore | H04N 7/162 380/239 |
| 2007/0098166 A1* | 5/2007 | Candelore | H04K 1/00 380/214 |
| 2007/0263860 A1 | 11/2007 | Buchen et al. | |
| 2007/0263864 A1 | 11/2007 | Buchen et al. | |
| 2007/0286417 A1* | 12/2007 | Pinder | H04L 63/0428 380/37 |
| 2007/0291940 A1* | 12/2007 | Candelore | H04N 7/162 380/210 |
| 2008/0095364 A1* | 4/2008 | Candelore | H04N 7/162 380/212 |
| 2008/0267400 A1* | 10/2008 | Unger | H04N 7/162 380/210 |
| 2009/0070355 A1* | 3/2009 | Cadarette | G06F 17/30516 |

(56) References Cited

U.S. PATENT DOCUMENTS

2009/0080653 A1* 3/2009 Candelore ............. H04N 7/162
 380/200
2009/0147954 A1* 6/2009 Pinder .................... H04N 7/163
 380/216
2011/0280396 A1 11/2011 Buchen et al.
2013/0028417 A1 1/2013 Buchen et al.

OTHER PUBLICATIONS

European Communication dated Aug. 24, 2009 cited in Application No. 07 783 490.1-1522.
Canadian Official Action dated May 27, 2010 cited in Application No. 2,652,123.
Japanese Office Action dated May 14, 2012 cited in Application No. 2009-511161.
U.S. Office Action dated Jul. 7, 2010 cited in U.S. Appl. No. 11/383,375.
U.S. Office Action dated Oct. 27, 2010 cited in U.S. Appl. No. 11/383,375.
U.S. Office Action dated May 7, 2013 cited in U.S. Appl. No. 13/190,514.
U.S. Final Office Action dated Oct. 9, 2013 cited in U.S. Appl. No. 13/190,514.
"ETR 211: Digital Video Broadcasting; Guidelines on implementation and usage of Service Information (SI)", ETSI Technical Report, Aug. 1997, pp. 1-42 (XP002131839).
European Communication dated Oct. 12, 2015 cited in Application No. 07 783 490.1, 6 pgs.

* cited by examiner

SYSTEM AND METHOD FOR DYNAMICALLY ALLOCATING STREAM IDENTIFIERS IN A MULTI-ENCRYPTION TRANSPORT SYSTEM

RELATED APPLICATIONS

This application is a divisional of co-pending U.S. application Ser. No. 13/626,006 entitled "System and Method for Dynamically Allocating Stream Identifiers in a Multi-Encryption Transport System", filed Sep. 25, 2012, which issued on Apr. 7, 2015 as U.S. Pat. No. 9,002,008 B2, which is incorporated herein by reference. Application Ser. No. 13/626,006 is a division of co-pending application Ser. No. 11/383,373 entitled "System and Method for Dynamically Allocating Stream Identifiers in a Multi-Encryption Transport System", filed May 15, 2006, which issued on Sep. 25, 2012 as U.S. Pat. No. 8,275,132 B2, which is incorporated herein by reference.

Related U.S. application Ser. No. 13/190,514 filed Jul. 26, 2011, which issued on Jun. 17, 2014 as U.S. Pat. No. 8,755,518 B2, which is a continuation of U.S. application Ser. No. 11/383,375 entitled "System and Method for Dynamically Allocating Stream Identifiers in a Multi-Encryption Transport System filed May 15, 2006, which issued on Jul. 19, 2011 as U.S. Pat. No. 7,983,417 B2, which is incorporated herein by reference.

U.S. application Ser. No. 11/383,375 filed May 15, 2006, which issued on Jul. 19, 2011 as U.S. Pat. No. 7,983,417 B2, is related to U.S. application Ser. No. 11/383,373 entitled "System and Method for Dynamically Allocating Stream Identifiers in a Multi-Encryption Transport System" filed May 15, 2006, which issued on Sep. 25, 2012 as U.S. Pat. No. 8,275,132 B2, which is incorporated herein by reference.

FIELD OF THE INVENTION

The present invention relates generally to the field of dual-encrypted streams in a communications system and more specifically towards dynamically allocating stream identifier information of a secondary stream in the system.

BACKGROUND OF THE INVENTION

Cable communications systems typically transmit encrypted data streams according to a single proprietary scheme. Accordingly, cable operators must purchase decryption, or set-top, devices, which reside at the subscriber's premises, that decrypt the data streams according to the proprietary encryption scheme. Obviously, it is to the cable operator's and the subscriber's benefit to be able to source multiple set-tops having different decryption schemes instead of having to choose just a single decryption set-top for the system. In this light, an operator now has an option of installing an overlay system, which allows for multiple encryption schemes and likewise multiple decryption devices that each decrypts one of the encrypted streams.

In an overlay system, however, special precautions should be taken to ensure multiple encrypted transport streams are not in conflict or do not collide. It will be appreciated that in a conventional communications system, there are varying levels of streams that comprise a transport stream. Very generally, a transport stream comprises a plurality of programs where each has a program number. Each of the program streams comprises video, audio, and data elementary streams. Furthermore, each elementary stream comprises video, audio, or data packets. A program number in a program association table (PAT) identifies each program and an associated program map table (PMT). Each PMT then identifies the elementary streams with packet identifiers (PIDs). The program numbers and PIDs are initially chosen out of a well known fixed range of numbers defined in the MPEG specification. Therefore, there exists a chance that two separate transport streams coming from different service providers that are transmitted using the same system, may include common identifiers (e.g., program numbers and PIDs) causing the two streams to overlap, thereby presenting program numbers and/or elementary stream packets that do not have unique identifying stream values, but are intended for two different decryption devices. In this case, a decryption device receives the encrypted stream with packets having different encryption schemes using the same identifier and may try to decrypt the wrong streams, which would then cause several problems. Accordingly, there exists a need to discover, monitor, and dynamically change the identifiers and stream routes in the transport streams in such a system to ensure that conflicts do not arise.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is suitable for use in a MPEG transport communications system that transmits multiple streams that use different encryption schemes over one system to receiving devices having multiple decryption schemes. The present invention allows for at least two different decryption devices (e.g., a primary set-top and a secondary set-top) to be located in a single system, which transmits streams having a primary encryption scheme and at least one other encryption scheme (i.e., an overlay, or secondary, encryption scheme). Each set-top is designed to decrypt either the primary or the secondary encryption scheme at one time. Prior to combining the multiple streams and in accordance with the present invention, a processing device analyzes the multiple encrypted streams to discover and monitor the program numbers and packet identifiers of the primary and secondary streams to ensure that any conflicts in the overlay streams and identifiers are corrected prior to transmission. More specifically, if a conflict is detected (i.e., the primary stream and the secondary stream have a same program number and/or packet identifier), the present invention dynamically changes the common identifier(s) in the secondary stream to a different identifier that is unique and does not conflict with any of the associated primary encrypted streams. Accordingly, the multiple streams are transmitted having different program numbers and/or packet identifiers. Additionally, the secondary, or overlay, decryption devices in the system are notified of the changed identifier(s) in the secondary stream to ensure proper processing and subsequent display.

Figure 1:
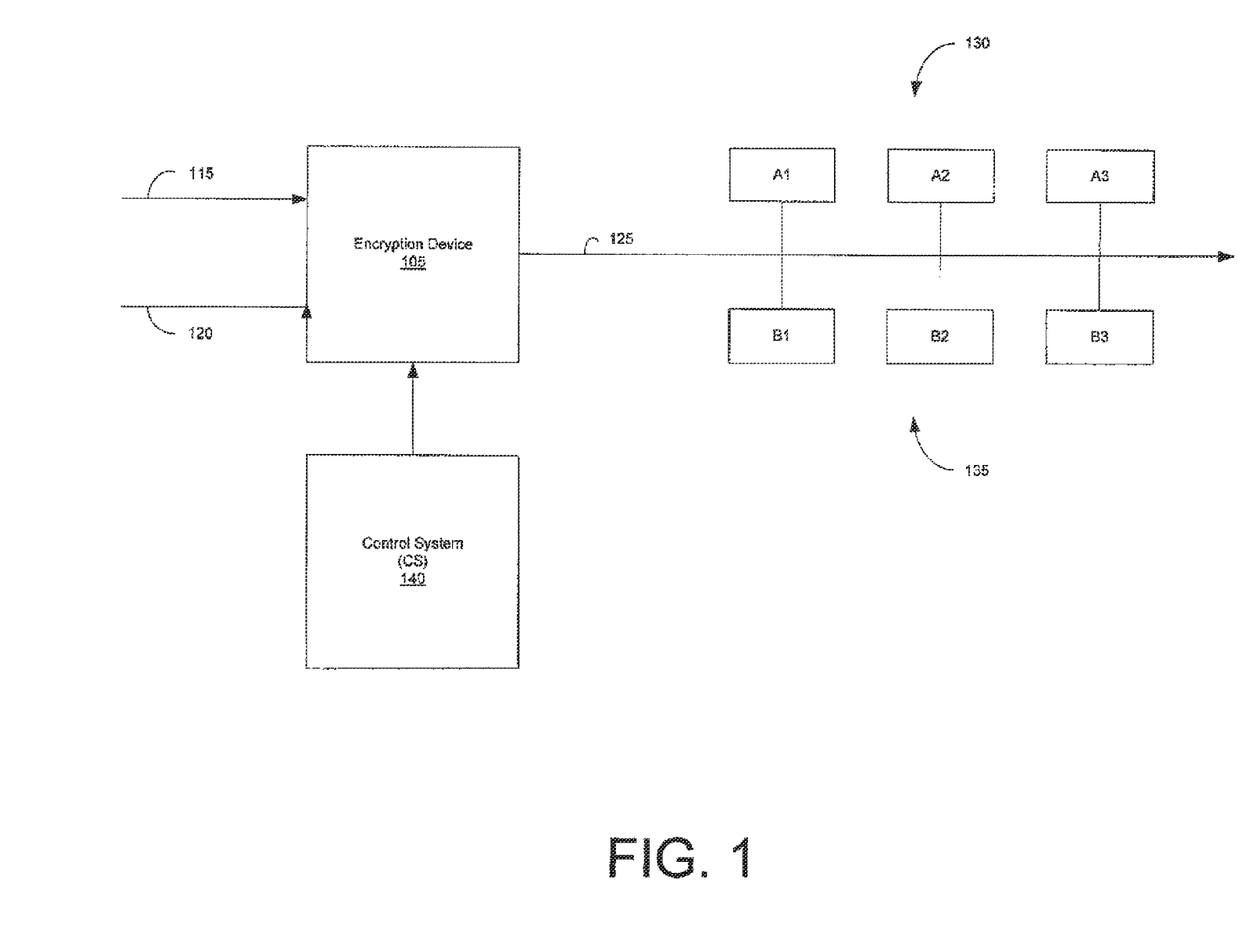
FIG. 1 is a simplistic block diagram of an overlay system that transports multiple encrypted streams with different encryption schemes to multiple decryption devices.

FIG. 1 is a simplistic block diagram of an overlay communications system that transports multiple encrypted streams with different encryption schemes to multiple decryption devices. In a headend facility, an overlay encryption device 105, such as, but not limited to, a quadrature amplitude modulation (QAM) modulator, receives a primary encrypted input stream 115 and a matching clear input stream 120. It will be appreciated that several encryption devices exist in the headend facility each receiving a copy of the primary encrypted input stream and the clear input stream according to predetermined configurations; however, only one encryption device 105 is shown for simplicity. The overlay encryption device 105 manipulates the primary encrypted input stream 115 and the clear input stream 120 to provide a partial dual encrypted stream 125 (i.e., a combined overlay output stream). The combined overlay output stream 125 comprises selected packets from the primary encrypted input stream and matching packets from the clear input stream that have been encrypted with a secondary encryption scheme combined with the remaining packets in the clear input stream. For example, 2% of packets included in the primary encrypted stream are chosen from the primary encrypted input stream. Matching packets of the clear input stream are then encrypted with the secondary encryption scheme. The 2% primary encrypted packets and the 2% secondary encrypted packets are then combined providing a 4% combined encrypted overlay stream. The 4% combined stream is subsequently combined with the 98% remaining clear input stream to provide 102% combined content packets in the combined overlay output stream 125. The combined overlay output stream 125 is then provided to multiple decryption devices 130, 135, where some devices 130 may have decryption schemes according to the primary encryption scheme that decrypt the primary 2% encrypted content Other devices 135 may have decryption schemes according to the secondary encryption scheme that decrypt the 2% encrypted content of the secondary encrypted stream. It will be appreciated that both devices 130, 135 receive and process the 98% clear stream. Further information regarding a dual-encrypted communications system can be found in copending U.S. patent application Ser. No. 10/629,839 entitled "Methods and Apparatus for Providing a Partial Dual-Encrypted Stream in a Conditional Access System" filed Jul. 30, 2003, the disclosure and teachings of which are hereby incorporated by reference.

A control system (CS) 140 provides complete management, monitoring, and control of the system's elements and broadcast services provided to users. Specifically in an overlay system, the control system 140 handles the provision and control information between the secondary decryption devices 135 and the overlay encryption device 105. In this manner, the CS 140 controls the output stream program numbers while the encryption device 105 controls all the packet identifiers for the secondary encrypted stream. Accordingly, the CS 140 and the overlay encryption device 105 discover and continuously monitor all program numbers and packet identifiers in the primary encrypted stream, and depending upon any conflicts, the program numbers and packet identifiers for the secondary encrypted stream are dynamically changed to avoid any conflicts in the combined output overlay stream 125.

Figure 2:
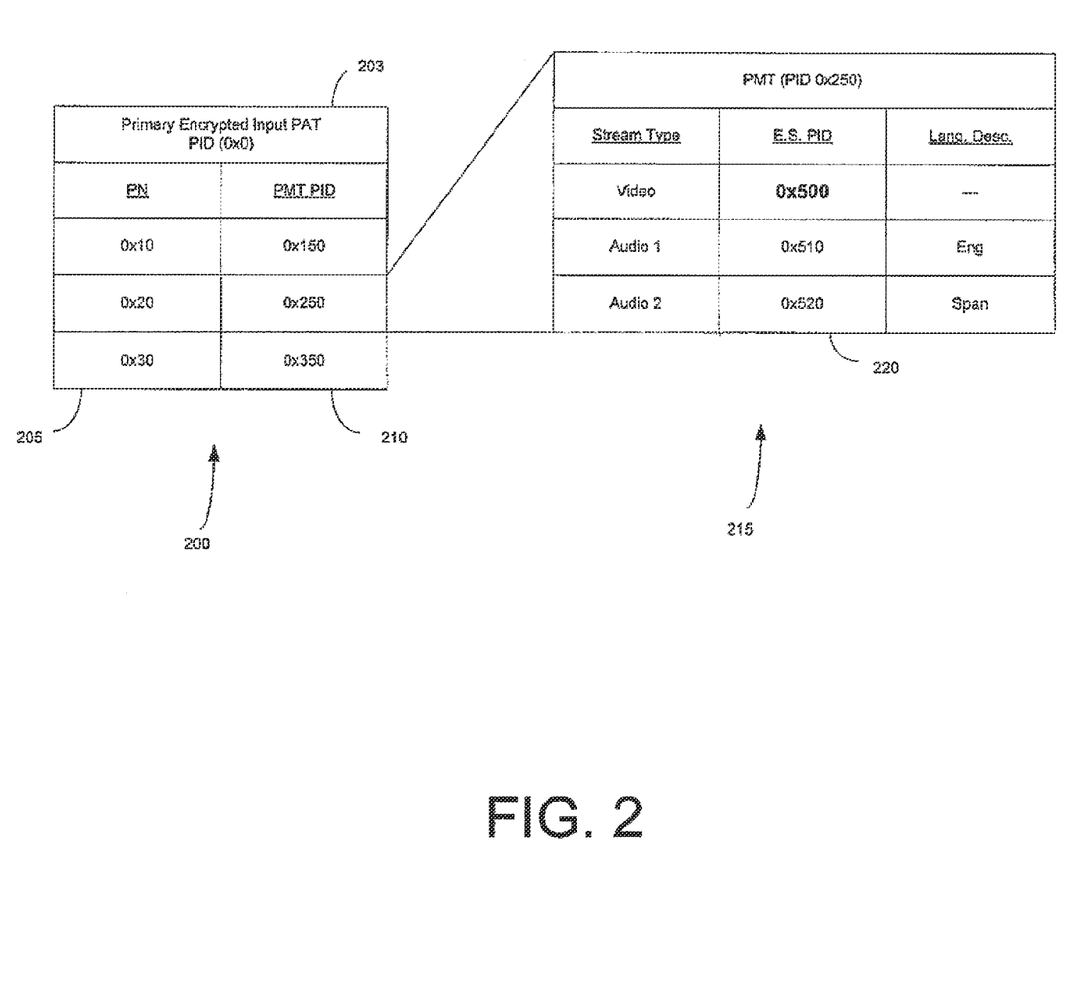
FIG. 2 illustrates a primary encrypted program association table (PAT) that is periodically transmitted along with the transport stream that the primary decryption devices access in order to locate a desired program and its components in the transport stream.

FIG. 2 illustrates a primary encrypted input program association table (PAT) 200. In an overlay system, this PAT is then parsed, recreated, combined with secondary program information, and then periodically transmitted along with the other components in transport stream 115. The primary decryption devices 130 access the combined overlay PAT 305 in order to locate a desired program and its components in the transport stream. In a non-overlay system, the receiving devices 130 identify and subsequently receive the PAT 200 by its reserved PID value of 0x0 203. The PAT 200 contains a list of all program numbers (PNs) 205 available in that transport stream and their associated program map table (PMT) PID values 210 for each program. A program is also known as a session since sessions reference a specific program in a transport stream. Each PMT PID value 210, for example, a PMT PID value of 0x250, in the primary encrypted input PAT 200 is associated with a PMT 215 that includes the elementary stream PID values of 0x500, 0x510, and 0x520. More specifically, the PMT 215, which is identified by program number 0x20, and associated by the PMT PID value of 0x250, identifies the video and audio packets 220 for the associated program. In accordance with the present invention, the secondary decryption devices 135 will not tune to program 0x20 in the example primary encrypted input PAT 200 and its associated PMT and alternatively accept their intended PAT and PMT values via their respective identifiers.

Figure 3:
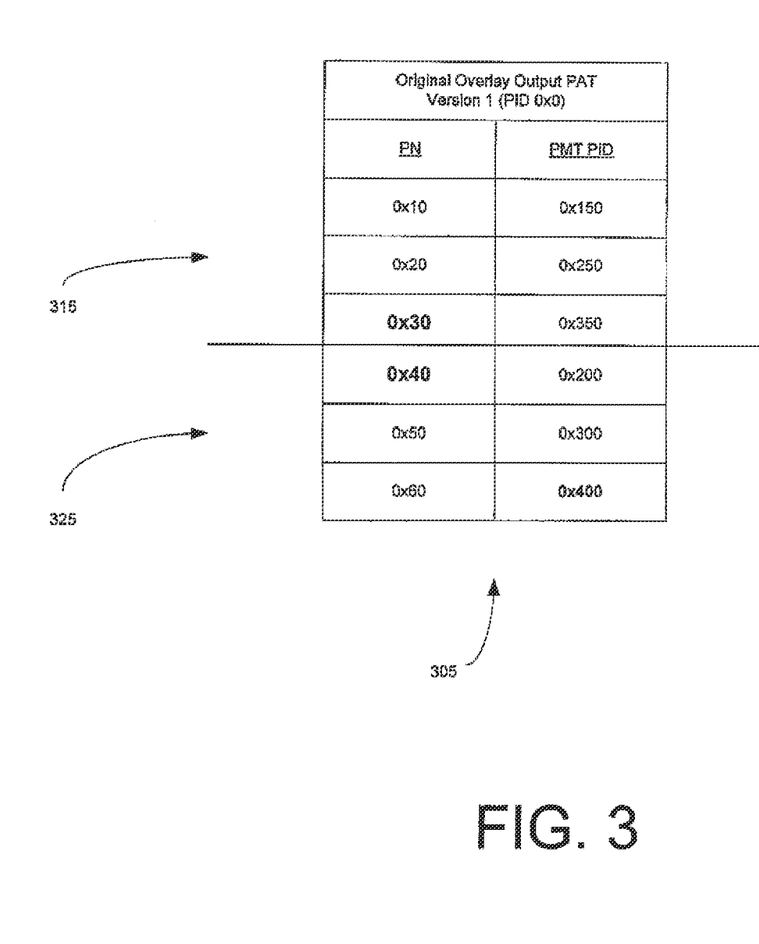
FIG. 3 illustrates an original overlay PAT that is periodically transmitted along with the transport stream that both the secondary and primary decryption devices access in order to locate a desired program and its components in the transport stream.

FIG. 3 illustrates an original output overlay program association table (PAT) (PID 0x0) that is periodically transmitted along with the transport stream that both the secondary and the primary decryption devices access in order to locate a desired program and its components in the transport stream. The output overlay PAT 305 transported in the combined output overlay stream 125 includes a PAT section that comprises the entire primary input encrypted PAT section 315 along with the added overlay program encrypted PAT section 325 for the secondary decryption devices 135. As mentioned, the secondary decryption devices 135 are instructed to tune to the transport stream for their associated program numbers included in the output overlay PAT 305 by looking for the PID value of 0x0 and subsequently searching the overlay program encrypted PAT section 325 for the desired program number (PN). The program numbers then identify program map tables (PMTS) by a PID value that include packet identifiers for the program stream packets in the combined output overlay stream 125.

The primary and secondary PAT sections 315, 325 are combined in the combined overlay output stream 125. The output overlay PAT 305 is shared between the two encryption systems and will contain the entire primary encrypted PAT programs along with the active secondary encrypted programs. The encryption device 105 performs primary encrypted input PID monitoring to dynamically reallocate PID and program number values to avoid any conflicts with the primary encrypted stream 115 in the combined overlay output stream 125. It will be appreciated that the primary encrypted stream PAT section 315 remains untouched and the primary encrypted stream flows without any conflicts between the primary and the secondary encrypted streams.

Figure 4:
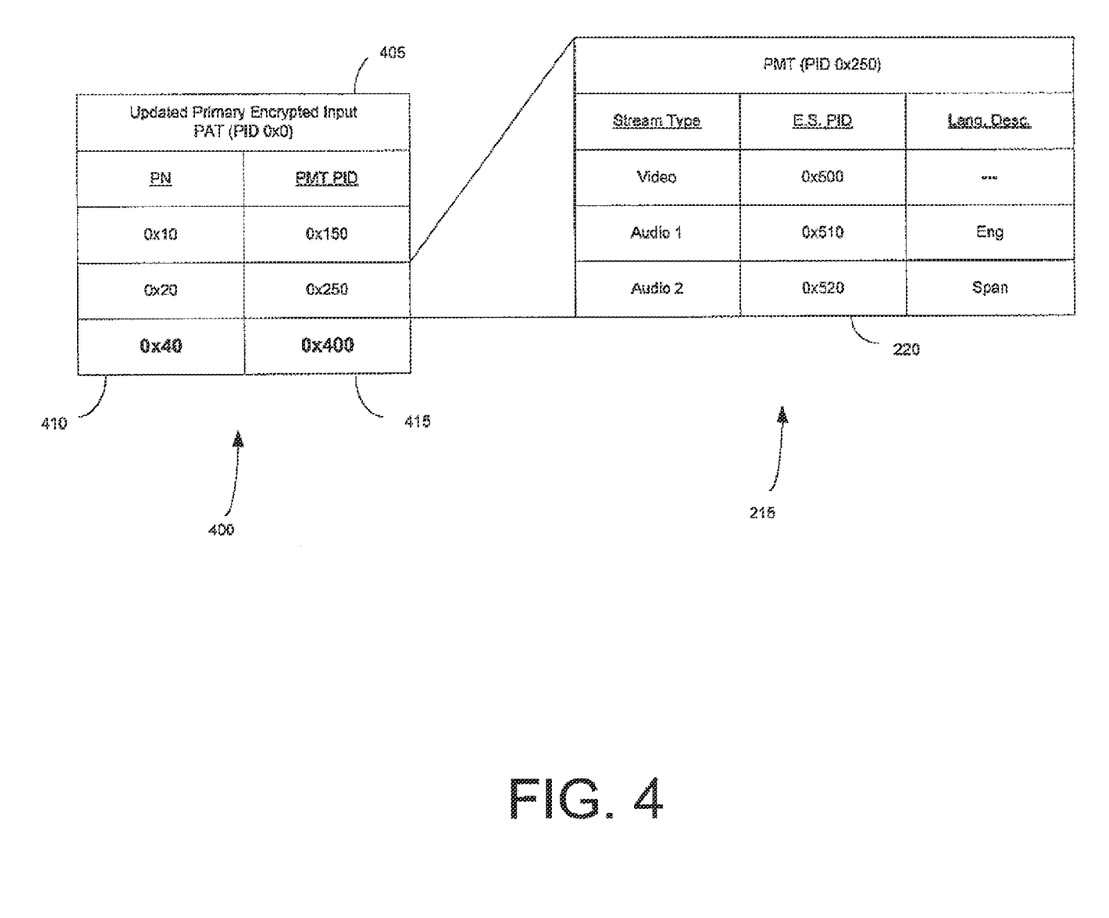
FIG. 4 illustrates an updated primary encrypted PAT.

FIG. 4 illustrates an updated program number in the primary encrypted PAT 400. In conjunction with FIG. 3, it is noted that the updated primary input encrypted PAT 400 now has a program number conflict in the overlay program encrypted PAT section 325 with program number 0x40, which is active in the secondary encrypted stream, and a PMT PID conflict with program number 0x60, which is also active in the secondary encrypted stream. In accordance with the present invention, the conflicts are detected prior to transmitting the primary and secondary encrypted streams.

Figure 5:
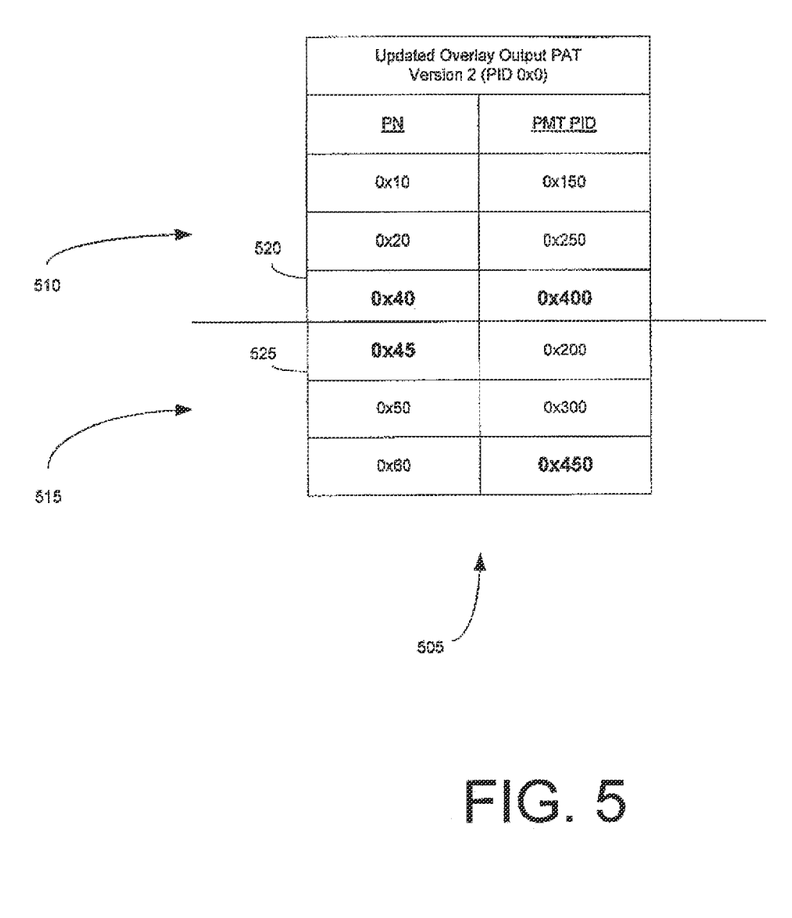
FIG. 5 illustrates an updated overlay PAT having a version 2 in accordance with the present invention.

FIG. 5 illustrates an updated overlay PAT (version 2) 505 in accordance with the present invention. Due to the program number 0x40 conflict, the secondary encrypted output program number 0x40 is changed to a new unused program number 525; in this case program number 0x45 is used. Furthermore, the updated encrypted input PAT program number 0x40 uses a PMT PID value of 0x400. Therefore, the updated primary encrypted stream PMT PID (i.e., 0x400) also conflicts with a PMT PID (i.e., 0x400) associated with program number 0x60 in the secondary encrypted stream. In accordance with the present invention, the conflict is detected, and the PMT PID 0x400 is changed to an unused PMT PID, which in this example is a value of 0x450. The updated output overlay PAT 505 that includes the updated primary encrypted input PAT section 520, the dynamically updated overlay program encrypted PAT section 515, and their associated PMT sections is then transmitted to both the primary and the secondary decryption devices 130, 135.

The updated overlay output PAT 505 having an incremented version number is used to signal the primary and the secondary decryption devices 130, 135 of the changed overlay stream values. Accordingly, the primary decryption devices 130 will correctly tune to program number 0x40 having a PMT PID value of 0x400, and the secondary decryption devices 135 will correctly tune the program stream using the new program number 0x45 having a PMT PID value of 0x200. It will be appreciated that the PMT PID associated with the revised program number 0x45 may not change if the PMT packet identifiers do not conflict with any active encrypted input stream using a PMT PID value of 0x200; therefore, the video and audio elementary packets for program number 0x45 are still located in a PMT using the PID value of 0x200. This is just an example and the algorithm is not limited or required to use the same PMT PID value for the updated stream now using program number 0x45. Additionally, the secondary decryption devices 135 correctly tune to program number 0x60 having an updated PMT PID value of 0x450.

Figure 6:
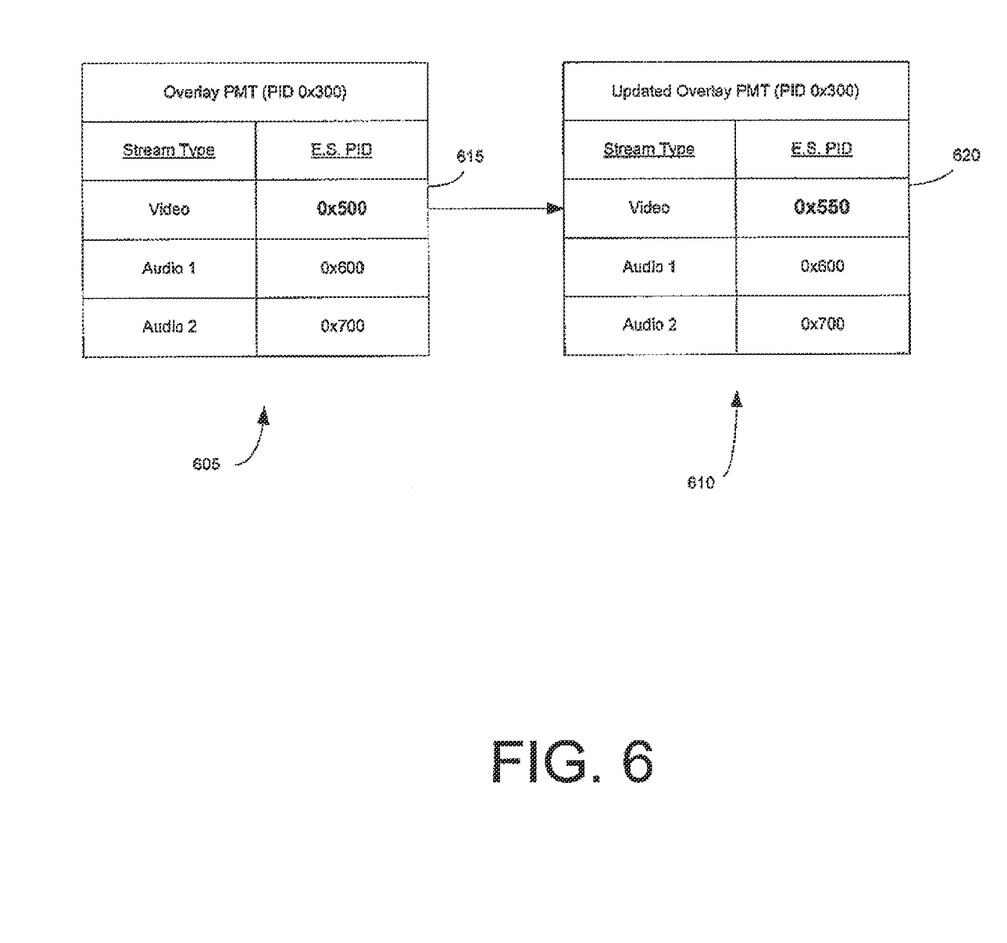
FIG. 6 illustrates an original overlay program map table (PMT) and an updated overlay PMT in accordance with the present invention.

FIG. 6 illustrates an original overlay program map table (PMT) and an updated overlay PMT in accordance with the present invention. The overlay PMT 605 has a PID value of 0x300 that is associated with a program number value of 0x50 shown in FIG. 3. In this example, however, the video PID value of 0x500 conflicts with a primary encrypted PMT PID 0x500 for the primary video stream as shown in the primary encrypted PMT 215 (FIG. 2). In accordance with the present invention, the conflict is detected and the conflicting overlay PID value of 0x500 615 is changed to an unused PID value of 0x550 620. The updated overlay PMT 610 is then transmitted along with the combined overlay output stream 125. The remaining PIDs in the PMT 605 do not require any modification since there is no conflict.

Figure 7:
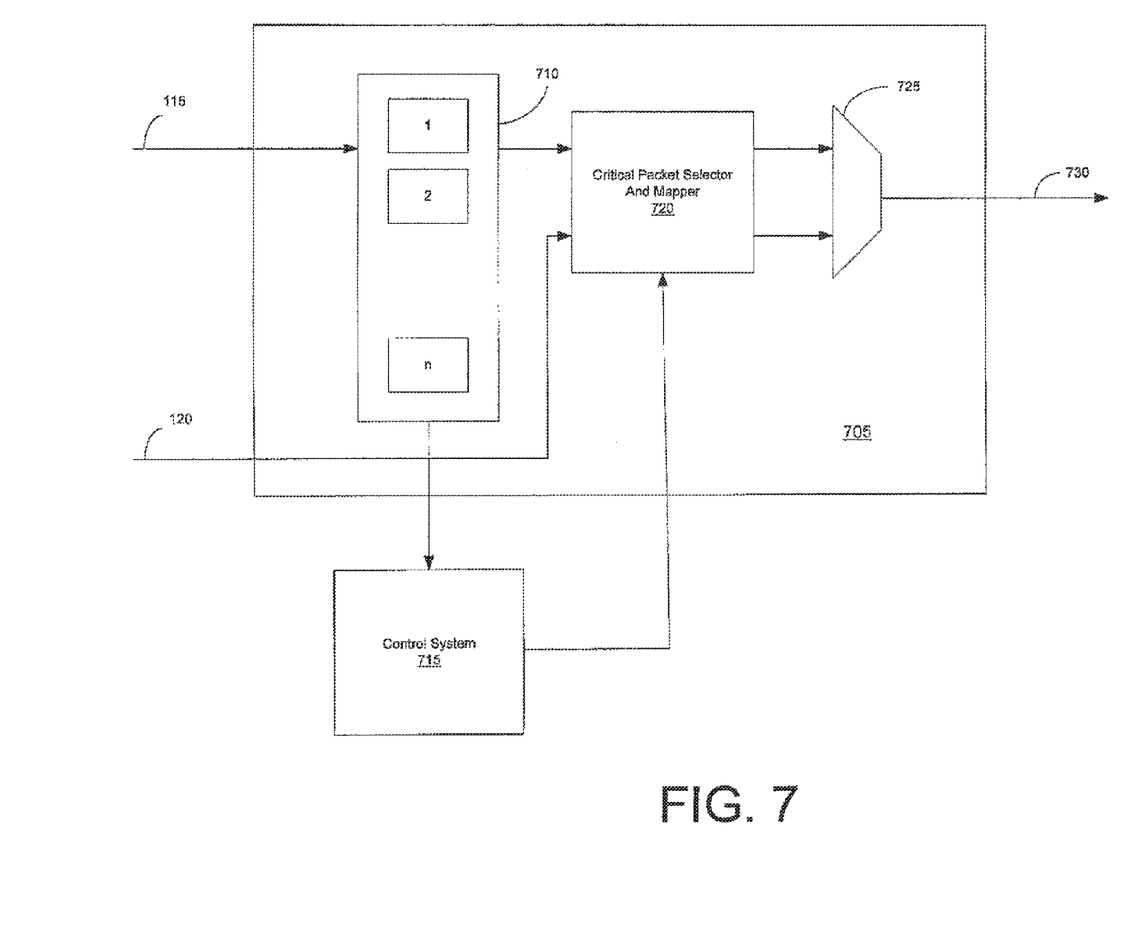
FIG. 7 is a block diagram of a processing, or encryption, device and control system that monitor, detect, and revise any conflicts in the program numbers and/or packet identifiers in accordance with the present invention.

FIG. 7 is a block diagram of a processing, or encryption device 705 that monitors, detects, and dynamically updates the secondary encrypted stream to correct for any conflicts in the program numbers and/or packet identifiers in accordance with the present invention. The example processing device 705 includes two asynchronous serial interface (ASI) input ports using 8192 32-bit counters at each port. A bank of counters 710 receives the primary encrypted input stream 115 and the matching clear input stream 120 through the input ports. Each counter 710(1-n) is used to monitor the primary encrypted input stream PID activity for all 8192 available PID values. In the discovery phase, each counter is originally set at 0. For each program number and packet identifier present in the primary encrypted input stream, a counter 710(1-n) associated with the present program number and every associated packet identifier is incremented by one. The processing device 705 monitors all counter values to detect which counters 710(1-n) have a value of zero and which counters 710(1-n) have a value greater than zero. It can then be determined that the counters 710(1-n) having a value of zero have had no activity and are available for the output overlay programs and packet identifiers for the secondary encrypted overlay output streams. Any counters 710(1-n) having a count value greater than zero indicate PID activity and are currently in use by the primary encrypted stream and, therefore, should not be used in any secondary overlay stream. Using the discovered PID information, the processing device 705 either initially assigns or changes the PAT and PMT sections for the secondary overlay streams to use values that do no conflict with the primary encrypted stream values.

At times, a program number and/or packet identifier in the primary stream may dynamically change and start using new stream PID and/or program number values. For these cases, a monitoring phase continues to monitor the counters 710 (1-n) for any updated changes. Accordingly, if a previously unused program number and/or packet identifier is later discovered in the primary encrypted input stream and that new identifier is conflicting with an already assigned identifier in the secondary overlay output stream, the processing device 705 updates the PAT and/or the PMT for the overlay output stream depending upon the stream values that changed. The updated PAT and/or PMT section is then immediately transmitted in the combined overlay output stream 125 to the secondary decryption devices 135 to signal the stream changes. Preferably, the primary encrypted input stream is gated until the updated overlay PAT and/or PMT are transmitted and stream routes are updated to ensure no disruption or conflict prior to the revision. Additionally, it will be appreciated that at some point, the counters 710a-n may become full; at which point, the counters 710a-n may be reset and the monitoring phase continues with identifying the program numbers and packet identifiers in use.

A critical packet selector and mapper 720 selects predetermined critical packets of the clear input stream. The critical packets are then encrypted with the second encryption scheme. The secondary encrypted packets are then mapped having an appropriate PID value in the PMT and/or PAT tables in accordance with the present invention. The tables, the primary and secondary encrypted packets, and the clear packets are subsequently multiplexed by multiplexer 725 to provide a combined overlay stream 730.

It will be appreciated that the processing device 705 of FIG. 7 works well in an environment or product that is limited to a small number of input ports. The PID and program number monitoring is performed after powering the processing device 705 and continues to monitor the primary encrypted input streams so the processing device 705 may quickly detect any dynamic PID and/or program number changes that affect the combined overlay output stream 125. Additionally, it is known that in a GIGA Ethernet or packet switching environment, products are designed to support a large number of unique input streams as compared to the ASI environment, which usually only supports a small number of unique input streams. Therefore, a large amount of memory would be required to keep track of the 8192 32-bit PID counters for each of the unique input streams in a GIGA Ethernet or packet switching environment.

Figure 8:
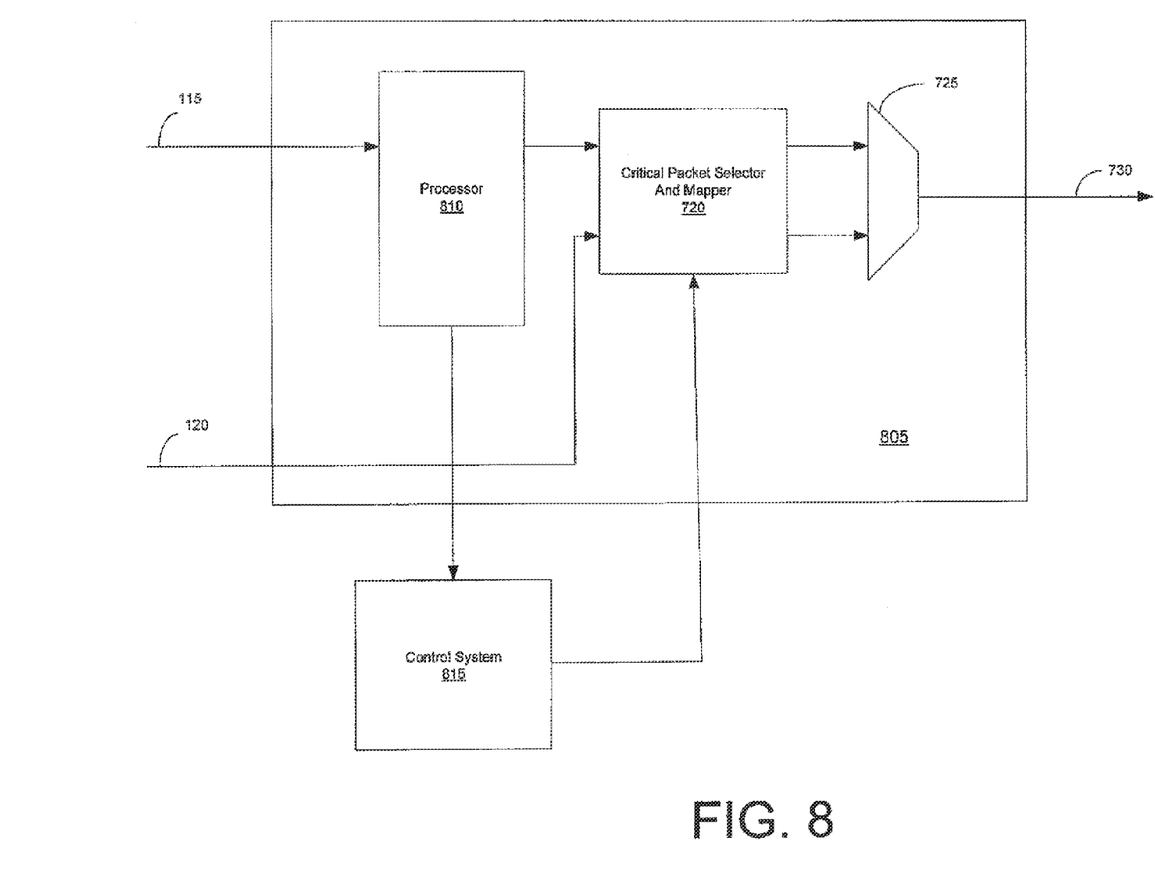
FIG. 8 is a block diagram of a continuous PID-monitoring processing device that is suitable for use in a GIGA Ethernet or a packet switched environment in accordance with the present invention.

FIG. 8 is a block diagram of a continuous PID-monitoring processing device 805 that is suitable for use in a GIGA Ethernet or packet switching environment in accordance with the present invention. Advantageously, the PID-monitoring processing device 805 is capable of receiving many more GIGA Ethernet or packet switched streams that are comprised in the primary encrypted input stream 115 while not requiring an inordinate amount of memory. Additionally, continuous monitoring of the streams will detect any dynamic stream changes after the initial power-up of the processing device 805. Therefore, in accordance with the present invention, the continuous PID-monitoring processing device 805 initially goes through a discovery phase and then continuously monitors the encrypted input stream 115 to detect any dynamic PID changes to the primary encrypted stream and makes changes to the output overlay stream 730, accordingly; thereby, avoiding duplicated PIDs that cause collisions in the combined overlay stream 730.

The continuous PID-monitoring device 805 includes a processor 810 that receives the primary encrypted stream 115. The processor 810 uses a single bit value, which corresponds to 16 bit values that comprise a PID, for each PID and a reset method to determine if any of the 8192 PID streams are active. The PID counters are continuously updated to a set/active state when any PID activity is detected The algorithm reads all the PID bit counters, and then resets all the counters, and enters back into the PID discovery mode. This method will catch the PID activity that fluctuates between active and not active so the PID counter states will not become stale. Using the bit method to indicate and store the PID activity saves memory in comparison to the processing device 705 of FIG. 7 and allows 8192 PID values to be stored in only 1024 bytes of memory. Initially at power up of the PID-monitoring device 805, the PID values of the primary stream are discovered and marked as "in-use." The in-use values are stored in a table indicating that they are currently allocated, or unavailable. Additionally, unallocated or free PID values are stored in a table that can be used by the secondary overlay stream.

The systems and methods described herein solve any duplicate identifiers by continuously monitoring and subsequently dynamically changing stream identifier values. At times, however, physical routes transporting the steams from the multiple encryption devices 105 may have to be changed in order to ensure that there are no cross stream issues with decryption devices 130, 135 that are currently watching a program. By way of example, assume a secondary decryption device 135 is viewing a baseball game on program number 0x17 with a video PID of 0x50 and an audio PID of 0x51. Due to a PID conflict with an adult channel, which may have just been added to the system, the processing device 705, 805 changes the overlay program number 0x17 that have PIDs 0x500 and 0x501, respectively. If the decryption device 135 doesn't dynamically change its PIDs to the updated PIDs, a cross stream issue will arise and it will begin to decrypt the adult channel having PIDs 0x50 and 0x51. Therefore, it is extremely important that programs are received only by the intended primary and secondary decryption devices 130, 135.

Accordingly, the physical connection between the input and the output of the processing device 705,805 is changed to eliminate a cross stream issue. If the route stays open with the original parameters after the stream changes, this may create the cross strewn issue since the physical connection from the input to the output is not updated. The control of the routes can be in an ASIC, in an FPGA, or code in a processor. The routes are set up to pass the data based on the information in the stream like PID value, User Datagram Protocol (UDP) port value, and Internet Protocol (IP) value. When a specific stream value like an identifier changes, the processing device 705, 805 recognizes the change and updates the route for that stream.

Additionally, a return PID first-in first-out (FIFO) system and method is used to store PID values that are in the process of being deleted and returned to the PID allocation table so that these values are not immediately allocated to any new secondary overlay program that is created. In a preferred embodiment, a 16 bit PID array is used. It will be appreciated, however, that the size can be scaled depending upon the processing device 705, 805 and the application. Each entry in the PID array will hold a PID value to return to the PID allocation table. After the FIFO PID array fills up, the code starts returning the oldest PID value to an unallocated status. The PID values may also be stored in NVM and restored to the PID allocation table and return PID FIFO after powering on the processing device 705, 805. In this manner, cross stream issues are minimized.

It will be appreciated that modifications can be made to the embodiment of the present invention that is still within the scope of the invention. Additionally, the present invention can be implemented using hardware and/or software that are within the scope of one skilled in the art. The embodiments of the description have been presented for clarification purposes; however, the invention is defined by the following claims.

What is claimed is:

1. A communications system for transmitting a multi-encrypted transport stream, the multi-encrypted transport stream including an incumbent stream, an overlay stream and a clear stream, each of the streams including a plurality of programs each having a program number and a plurality of packets each having a packet identifier, the communications system comprising:

a device for dynamically allocating program numbers and packet identifiers associated with the overlay stream depending upon the program numbers and packets identifiers present in the incumbent stream, the device comprising:

monitoring means for monitoring and detecting the program numbers and packet identifiers present in the incumbent stream wherein the monitoring means comprises counters for incrementing a program number value and a packet identifier value when present in the incumbent stream;

processing means for assigning unused program numbers and packet identifiers to packet associated with the overlay stream wherein the processing means detects any unused counters and subsequently assigns an associated unused counter value as one of a program number and a packet identifier in the overlay stream, and wherein the monitoring means continuously monitors the incumbent stream for any changes in program number and packet identifiers, and when changes occur, the processing means checks for conflicts and subsequently reassigns the overlay packet having a conflicting program number or a conflicting packet identifier to another unused program number and packet identifier.

2. The communications system of claim 1, wherein the device transmits an initial program association table and program map tables including the program numbers and packet identifiers, respectively, that are associated with the overlay stream to a plurality of overlay receiving devices, and wherein in the event of a reassignment, the device transmits a revised program association table and program map tables depending upon the detected conflict.

3. The communications system of claim 2, wherein in the event of a conflict, the device suspends transmission of the incumbent stream and the overlay stream until the reassignment is complete and the revised program association table and the program map tables reflecting the reassignment are transmitted to the overlay receiving devices.

4. The communications system of claim 1, wherein the processing means detects a new unused counter value that was previously in use by the incumbent stream and stores the new unused counter value in a table for buffer its availability.

5. A method for transmitting a multi-encrypted transport stream, the multi-encrypted transport stream including an incumbent stream, an overlay stream and a clear stream, each of the streams including a plurality of programs each having a program number and a plurality of packets each having a packet identifier, the method comprising:

dynamically allocating, by a device, program numbers and packet identifiers associated with the overlay stream depending upon the program numbers and packets identifiers present in the incumbent stream;

monitoring and detecting, by the device, the program numbers and packet identifiers present in the incumbent stream;

assigning, by the device, unused program numbers and packet identifiers to packet associated with the overlay stream;

continuously monitoring, by the device, the incumbent stream for any changes in program number and packet identifiers;

in response to detecting changes in program number and packet identifiers,
checking, by the device, for conflicts, and
reassigning the overlay packet having a conflicting program number or a conflicting packet identifier to another unused program number and packet identifier;
incrementing, by counters in the device, a program number value and a packet identifier value when present in the incumbent stream;

detecting, by the device, any unused counters; and subsequently assigning an associated unused counter value as one of a program number and a packet identifier in the overlay stream.

6. The method of claim 5, further comprising transmitting, by the device, an initial program association table and program map tables including the program numbers and packet identifiers, respectively, that are associated with the overlay stream to a plurality of overlay receiving devices, and wherein in the event of a reassignment, transmitting, by the device, a revised program association table and program map tables depending upon the detected conflict.

7. The method of claim 6, wherein in the event of a conflict, suspending, by the device, transmission of the incumbent stream and the overlay stream until the reassignment is complete and the revised program association table and the program map tables reflecting the reassignment are transmitted to the overlay receiving devices.

8. The method of claim 5, further comprising:
detecting, by the device, a new unused counter value that was previously in use by the incumbent stream; and
storing, by the device, the new unused counter value in a table for buffer its availability.

* * * * *